D. P. PERRY.
STORAGE BATTERY.
APPLICATION FILED JAN. 2, 1904. RENEWED MAR. 18, 1908.

No. 902,681.

Patented Nov. 3, 1908.

2 SHEETS—SHEET 2.

Witnesses:
M. J. McSike
Robert H. Weir

Inventor:
David P. Perry
By Bulkley & Durand
Attys.

UNITED STATES PATENT OFFICE.

DAVID P. PERRY, OF CHICAGO, ILLINOIS, ASSIGNOR, BY MESNE ASSIGNMENTS, OF TWO-THIRDS TO WILLIAM MORRISON, OF CHICAGO, ILLINOIS, AND ONE-THIRD TO M. A. LOMBARD, OF DES MOINES, IOWA.

STORAGE BATTERY.

No. 902,681.      Specification of Letters Patent.      Patented Nov. 3, 1908.

Application filed January 2, 1904, Serial No. 187,430½. Renewed March 13, 1908. Serial No. 421,920½.

*To all whom it may concern:*

Be it known that I, DAVID P. PERRY, a citizen of the United States of America, and resident of Chicago, Cook county, Illinois, have invented a certain new and useful Improvement in Storage Batteries, of which the following is a specification.

My invention contemplates an improved and highly efficient form of alkaline storage-battery.

In a storage-battery characterized by my invention, the negative element may be of any suitable known or approved character, as, for example, it may consist of a perforated copper tube containing an oxid of silver and nickel, and provided exteriorly with one or more layers of porous material, such as paper and linen.

The electrolyte consists preferably of a plain or simple alkaline solution, such as potash or soda; and the positive element is also preferably of a particular character, that is to say, it consists preferably of a copper or other suitable support containing or provided with suitably prepared copper and cadmium, or other equivalent substance, such, for example, as an oxid of these two metals, said oxid returning to a metallic state, of course, when the battery is charged, and then again assuming the form of an oxid when the battery is discharged.

The nature and advantages of my invention will, however, hereinafter more fully appear.

Figure 1:
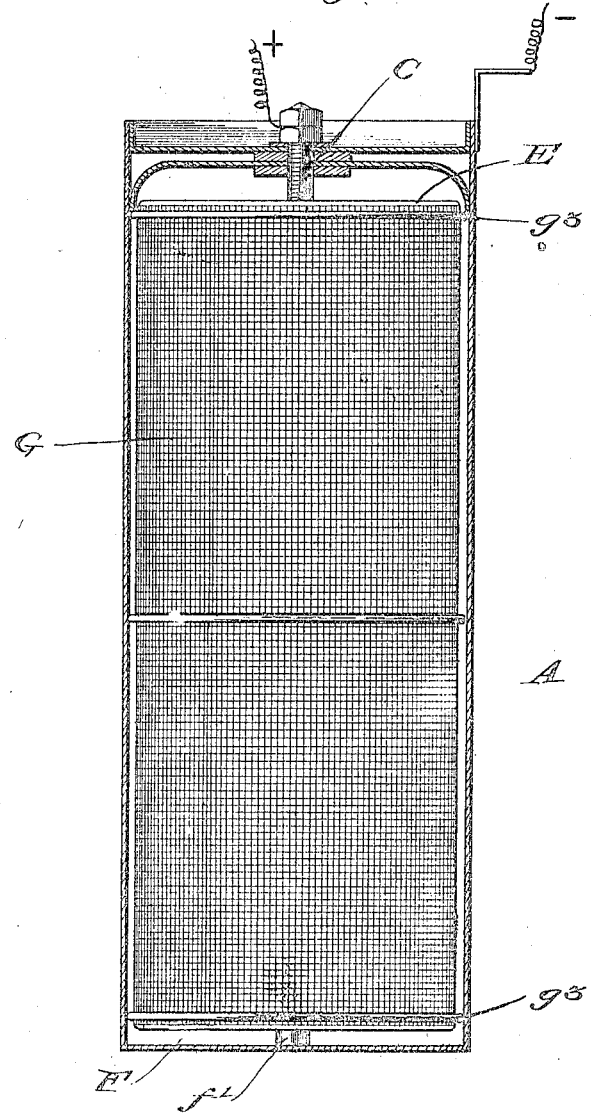
Figure 2:
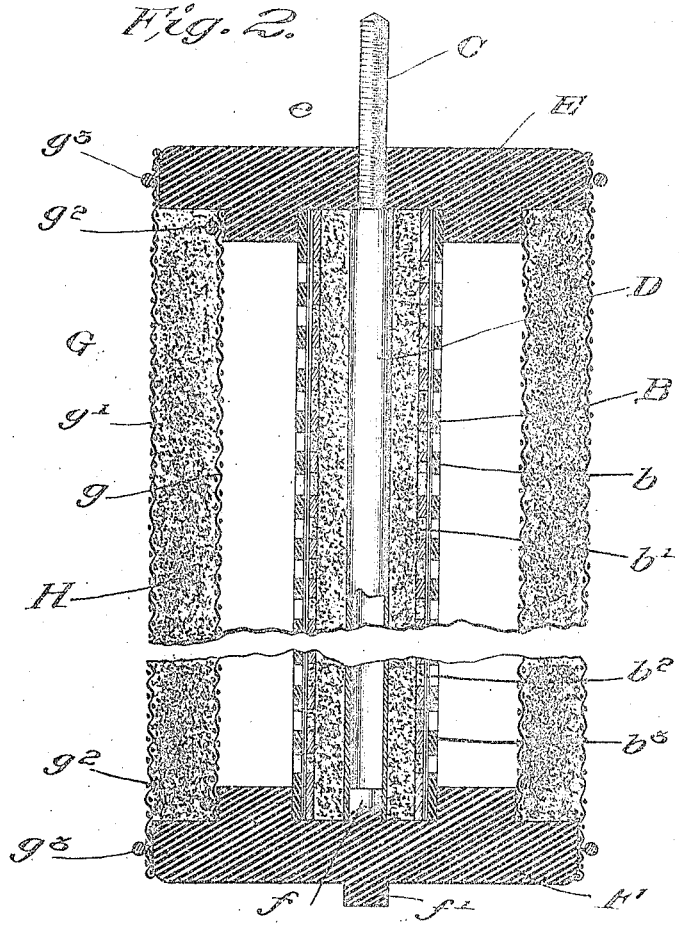
Figure 3:
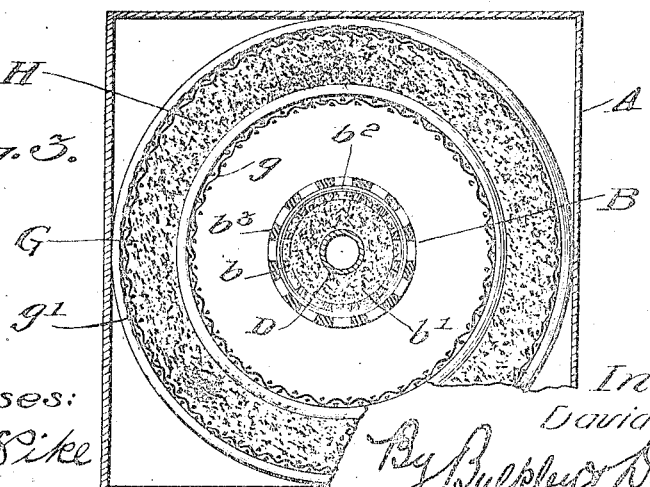

In the accompanying drawings,—Figure 1 is a side elevation of a storage battery involving the principles of my invention, the cell or copper receptacle being shown in vertical section. Fig. 2 is an enlarged vertical section of the cylindric unitary structure, comprising the positive and negative elements, the same being broken away at the center for convenience of illustration. Fig. 3 is an enlarged horizontal section of the battery shown in Fig. 1.

As thus illustrated, my improved storage battery comprises preferably a copper or other suitable metallic cell A. This cell, as illustrated, is preferably of an upright character, and is adapted to receive the vertically disposed cylindric structure constituting the negative and positive elements. The said negative element B preferably consists of a perforated copper tube $b$, filled with suitable active material, or material to become active, such, for example, as a suitably prepared oxid of silver and nickel $b'$. The said copper tube is preferably provided exteriorly with a covering of one or more layers of suitably porous material $b^2$, as, for example, superimposed layers of paper and linen; and upon these layers of porous material the perforated rubber tube $b^3$ is tightly fitted and arranged in place, as shown in the drawings.

The positive pole C, as illustrated, may consist of a rod or bolt secured to the upper end of a tubular conductor D, which latter may consist of a copper tube arranged concentrically at the center of the negative element. Rubber caps E and F can be applied, respectively, to the upper and lower ends of said negative element, as illustrated; and by reason of the projection $f$ on the lower cap, and the opening $e$ in the upper cap, the conductor D is held rigidly in place at the center of the negative element. Also, if desired, the cap F can be provided with a lower projection or foot $f'$, the same being adapted to bear upon the bottom of the cell and thus support the combined negative and positive element structure, when the latter is in place, as shown in Fig. 1. The positive element G, cylindric in form and arranged concentrically with respect to the inner or negative element, consists preferably of concentrically arranged inner and outer cylinders $g$ and $g'$. These concentrically arranged inner and outer cylinders $g$ and $g'$, constituting the support or grid of the positive element, may be of any suitable material, as, for example, wire gauze. In such case, the said cylinders of wire gauze are preferably bound or held firmly in place on the cylindrical surfaces of the caps E and F, by means of rings or clamping bands $g^2$ and $g^3$ applied as shown more clearly in Fig. 2. The copper wire gauze, as thus applied in the form of cylindric screens and held firmly in place relatively to the inner or negative element, provide between them an annular space or chamber adapted to receive the powder-like oxid of copper and cadmium H; and it will be readily understood that the copper and cadmium can be applied to the support of the positive element in any suitable or desired manner. I find, however, that very good and efficient results are obtained by combining one part of copper to two parts of cadmium, reducing the same to a powder-like oxid, and then packing or suitably introducing the copper and cadmium in this form into the annular space or chamber between the wire gauze cylinders $g$ and $g'$.

An efficient and satisfactory process of preparing the copper and cadmium and the positive element is as follows: First, take a suitable quantity of copper and cadmium, preferably in the proportion of one part of copper to two parts of cadmium, and dissolve the same in nitric acid. Then precipitate these dissolved metals by adding an alkaline solution, such as potash. When the metals are thoroughly precipitated, then pour off the liquid and wash the precipitate thoroughly with water. After this, permit the precipitate to dry in any suitable manner. The resulting product is a dry, or practically dry, powder-like oxid of the two metals thus simultaneously dissolved and precipitated. This process of preparing a storage battery positive element is, however, fully described and claimed in my co-pending application No. 186755 filed by me December 26, 1903, for improvement in "Process of preparing storage battery elements."

Thus it will be seen that I provide a construction and combination of ingredients whereby an electrolyte consisting of a plain or simple alkaline solution may be employed with good results. The copper cell A, preferably square in horizontal cross-section, as shown in Fig. 3, makes firm contact with the exterior surface of the positive element, thereby permitting it to serve as the negative pole of the battery. In the charge, the current passes from the positive pole C down through the conductor D, thence through the negative element and the electrolyte and the positive element G, and finally through the copper cell or receptacle A to the negative pole of the battery. The passage of a current, of the proper character, through the battery in this manner serves to charge the battery; and then in the discharge the current generated by the battery flows from the positive element through the electrolyte to the negative element, thence from the positive pole of the battery through the circuit back to the cell or copper receptacle constituting the negative pole. This, however, is well understood and does not, therefore, need further description. It will also be readily understood that during the charging of the battery, and also during the discharge, there are certain chemical changes which necessarily take place, but which need not be described. The battery, if constructed according to directions, will operate well and give satisfactory results.

Preferably, the battery is, as shown, employed in upright form. In other words, I find it preferable to arrange the elements in a vertical position, and one within the other, as shown.

When placed in the battery, the positive element, of course, contains the copper and cadmium in an oxidized condition. As soon as the battery is charged, however, the oxid of these two metals returns to a metallic state. Then in the discharge, the metallic copper and cadmium again become an oxid.

What I claim as my invention is:

1. A storage battery comprising an upright copper cell, an alkaline electrolyte, a vertically disposed and suitably constructed negative element, and a positive element inclosing said negative element, said positive element consisting of concentrically arranged cylinders of copper wire gauze with an interposed layer or mass of suitably prepared copper and cadmium oxid the oxid of the positive element returning to a metallic state when the battery is charged.

2. A storage battery comprising an upright metallic cell, an alkaline electrolyte, an upright cylindric and suitably constructed negative element, and a cylindrical positive element inclosing said negative element, said positive element consisting of concentric cylinders of copper wire gauze, with an interposed layer or mass of suitably prepared metallic oxid the oxid of the positive element returning to a metallic state when the battery is charged.

3. A storage battery comprising an upright copper cell, an alkaline electrolyte, an upright negative element consisting of a perforated copper tube filled with a suitably prepared oxid and provided with an external covering of porous material, and a positive element inclosing said negative element, said positive element consisting of concentric cylinders of copper wire gauze with an interposed layer or mass of suitably prepared oxid of copper and cadmium the oxid of the positive element returning to a metallic state when the battery is charged.

Signed by me at Chicago, Cook county, Illinois, this 12th day of December, 1903.

DAVID P. PERRY.

Witnesses:
S. B. CHABOWSKI,
WM. A. HARDERS.